United States Patent [19]
McDonald

[11] 3,729,680
[45] Apr. 24, 1973

[54] RADIO PAGER WITH VOICE MESSAGE AND SUBSTITUTE PAGING NUMBERS

[76] Inventor: Ramsey H. McDonald, 1046 S. 23rd Street, Richmond, Ind.

[22] Filed: Mar. 29, 1971

[21] Appl. No.: 129,023

[52] U.S. Cl. ....................325/55, 325/57, 325/64, 340/311, 340/171, 340/224
[51] Int. Cl. ....................H04b 1/00
[58] Field of Search....................325/55, 64, 66, 57; 340/310, 311, 171, 224

[56] References Cited

UNITED STATES PATENTS

| | | | |
|---|---|---|---|
| 3,140,468 | 7/1964 | Blaisdell et al. | 325/55 |
| 3,510,864 | 5/1970 | McDonald | 340/311 |
| 3,588,371 | 6/1971 | Monte | 325/55 |
| 3,626,112 | 12/1971 | Henquet | 325/55 |

*Primary Examiner*—Albert J. Mayer
*Attorney*—Woodard, Weikart, Emhardt & Naughton

[57] ABSTRACT

A paging system operably connecting remote paging receivers with an incoming call and having substitute paging numbers assignable to the remote paging receiver. A first digit selector connects the incoming call to a two digit selector after the appropriate fifth digit of a seven digit number has been inserted into the first digit selector. The sixth and seventh digits of the seven incoming signal are then routed to the two digit selector which is connected to tone generators which produce pairs of tones assigned to the sixth and seventh digits. The pair of tones is routed through a dial-a-spare panel which is operable to substitute a second pair of preselected tones for the first pair of tones. A selector finder is connected to the two digit selector and when transmitter time is available connects the incoming trunk lines of the first digit selector to the transmitter via a terminal assembly.

7 Claims, 9 Drawing Figures

Patented April 24, 1973 3,729,680

7 Sheets-Sheet 1

INVENTOR
RAMSEY H. MC DONALD
BY
Woodard, Weikart, Emhardt & Naughton
ATTORNEYS

INVENTOR.
RAMSEY H. McDONALD
BY
Woodard, Weikart, Emhardt & Naughton
ATTORNEYS

INVENTOR.
RAMSEY H. McDONALD
BY
*Woodard, Weikart, Emhardt & Naughton*
ATTORNEYS INVENTOR.
RAMSEY H. McDONALD
BY
Woodard, Weikart, Emhardt & Naughton
ATTORNEYS Patented April 24, 1973 3,729,680

7 Sheets-Sheet 5

INVENTOR
RAMSEY H. McDONALD
BY
Woodard, Weikart, Emhardt & Naughton
ATTORNEYS

INVENTOR.
RAMSEY H. McDONALD
BY
Woodard, Weikart, Emhardt & Naughton
ATTORNEYS

RADIO PAGER WITH VOICE MESSAGE AND SUBSTITUTE PAGING NUMBERS

BACKGROUND OF THE INVENTION

1. Field of the Invention

The field of the invention is generally switching systems and more particularly selective signaling systems for radio paging receivers.

2. Description of the Prior Art

Selective radio paging by the use of tone sequence encoding is well known in the art. A problem with the prior art paging systems has been the inability to receive and store a paging request for one person during the interval that another person was being paged. My U.S. Pat. No. 3,510,864 entitled "Paging Encoder" solved this problem by providing an apparatus capable of receiving and storing a paging request and further provided a circuit for inhibiting the apparatus from keying the radio transmitter while the transmitter was being utilized for voice communication.

Another problem of the prior art paging systems is that frequently the remote paging receiver will become inoperative therefore requiring a substitute paging receiver having a new receiving address. Thus, callers of the person previously having the inoperative receiver must utilize the new address of the substitute receiver to reach that person. The present invention solves this problem by providing an apparatus which allows incoming calls to be directed to the new receiver even though the address of the inoperative receiver has been inserted into the system. Another advantage of the present invention is that the apparatus disclosed herein provides a prerecorded voice message or real time voice message after the receiver has been signaled. An intercept circuit is provided which intercepts erroneous input dialed signals thereby providing an intercept service. Means are provided whereby the length of on air time of the voice message is strictly controlled. In addition, any non-working address may be removed from the system.

SUMMARY OF THE INVENTION

One embodiment of the present invention is a paging system adapted to be connected to a radio base station transmitter comprising: digit selectors operable to distinguish pairs of incoming pulse signals; tone generators connected to said digit selectors and being arranged to generate a given pair of tones upon command by said digit selectors; means operable to replace a certain pair of said tones with a preselected pair of tones; and, selecting means connected to said digit selectors and operable to direct only one pair of said preselected tones to the radio base transmitter.

It is an object of the present invention to provide a radio paging system whereby the substitute paging receiver may be reached by dialing into the system the address of the replaced paging receiver.

It is a further object of the present invention to provide a dial access paging system for signaling coded receiver units and thereafter providing a voice message.

Yet another object of the present invention is to provide a new and improved paging system adapted to be connected to a radio base station transmitter.

Related objects and advantages of the present invention will be apparent from the following description.

DESCRIPTION OF THE PREFERRED EMBODIMENT

Figure 1:
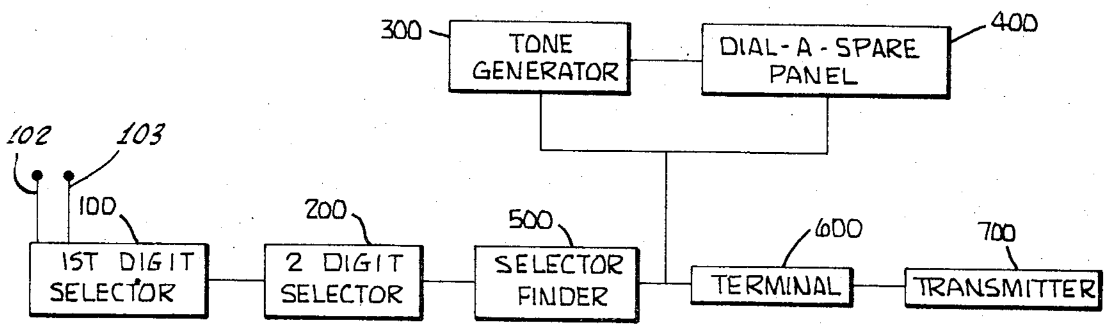
FIG. 1 is a block diagram of the electrical circuitry incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art of which the invention relates.

Operation of FIG. 1

Figure 2:
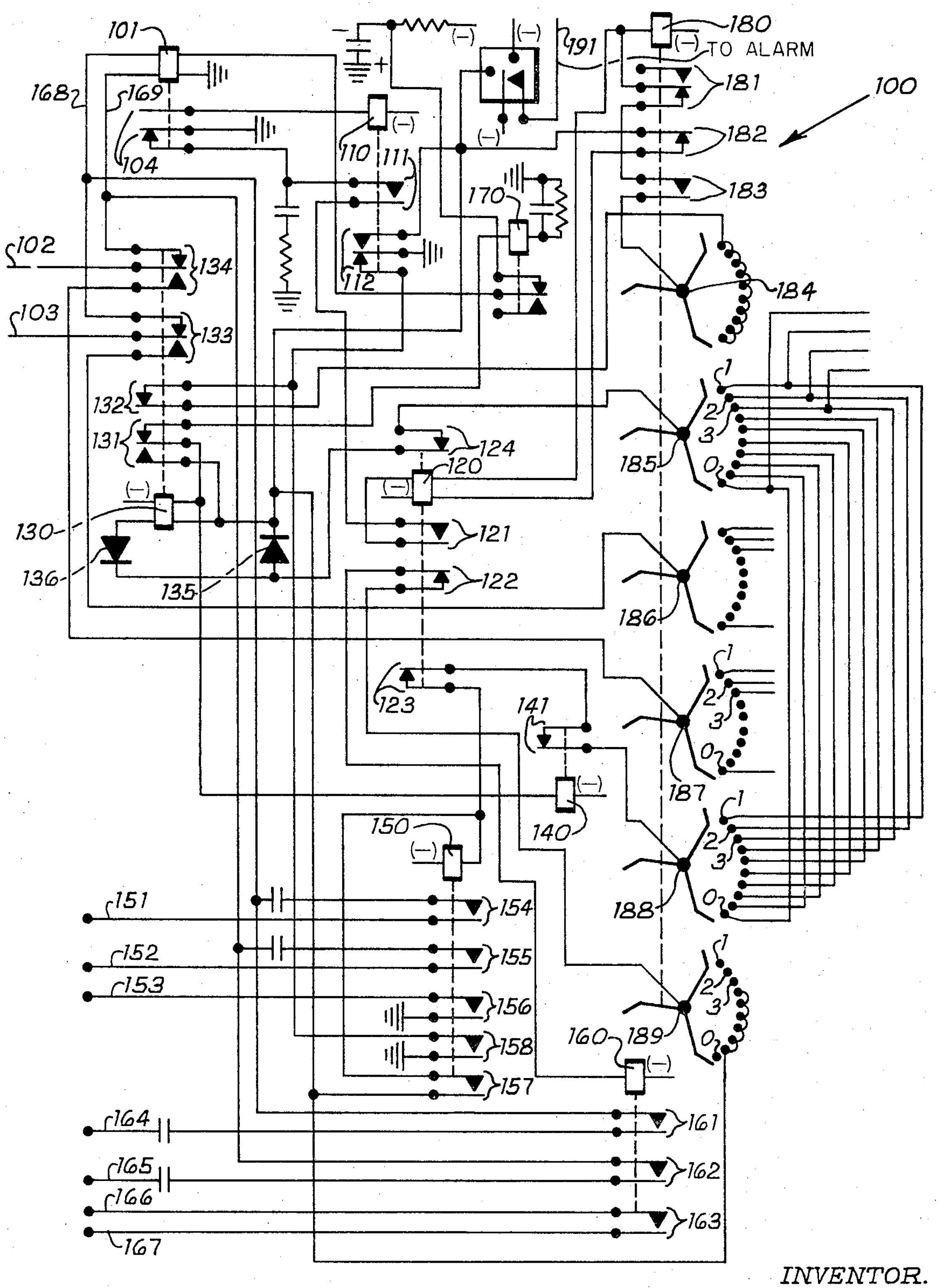
FIG. 2 is a schematic diagram of the first digit selector.
Figure 3:
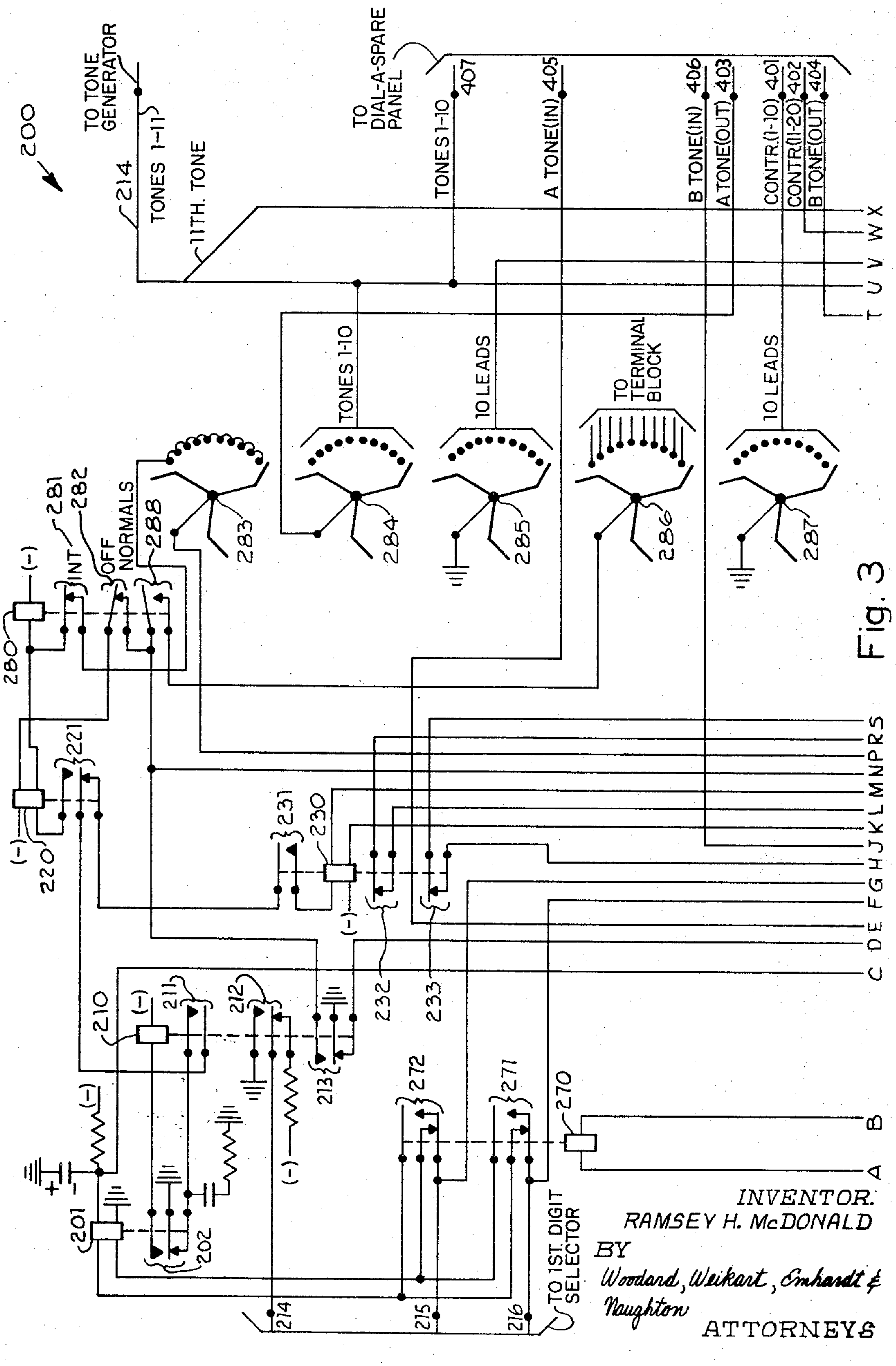
FIGS. 3 and 3A is a schematic diagram of the two digit selector with the diagram being broken into two figures due to size limitations. The alphabetical leads of FIG. 3 being connected to the corresponding alphabetical leads of FIG. 3A.
Figure 3A:
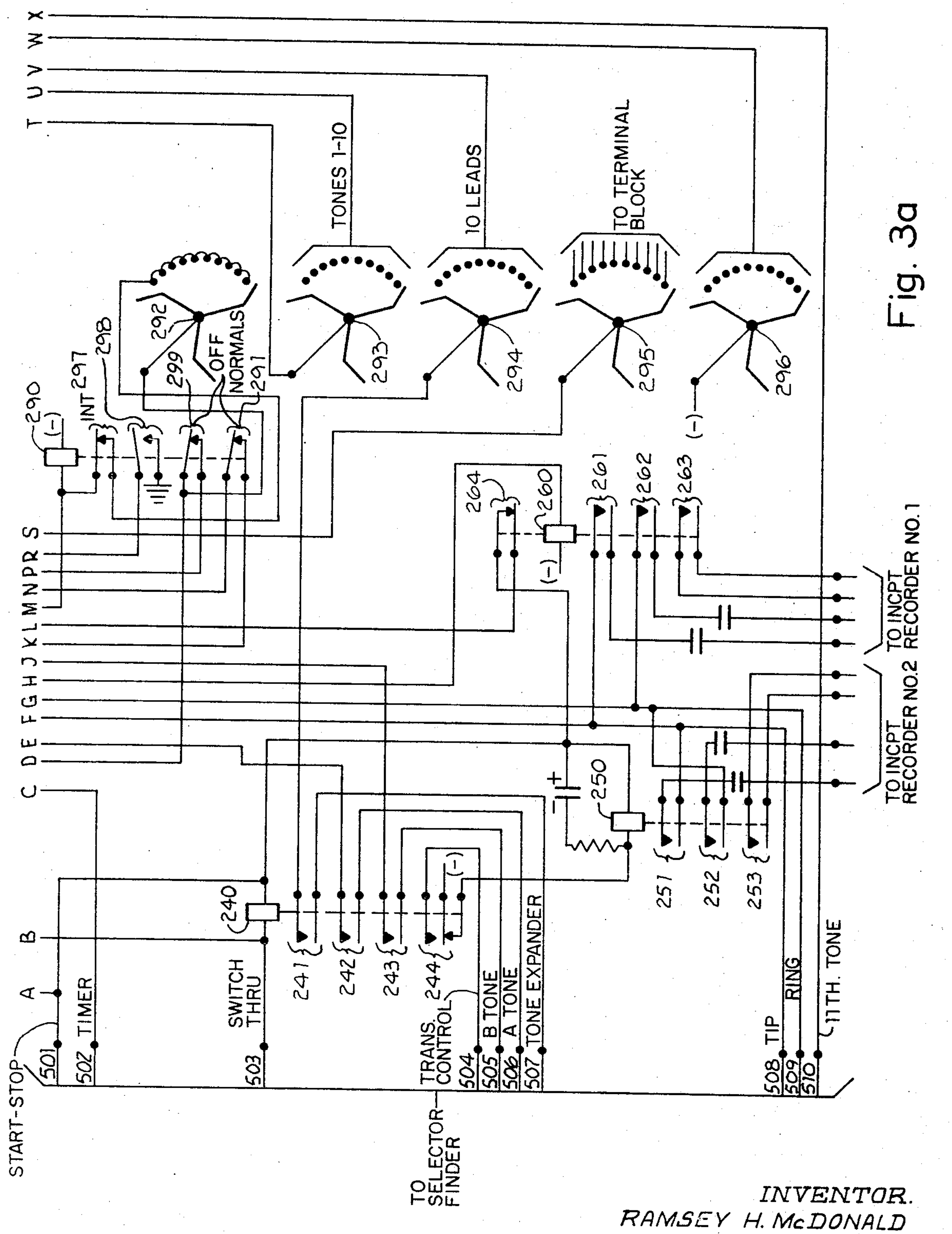

FIG. 1 shows a block diagram of electrical circuitry incorporating the present invention. The remote paging receivers may be reached by dialing a seven digit number. The first four digits are handled by the central office equipment which is then connected by trunk lines 102 and 103 to the apparatus disclosed herein and shown in block form in FIG. 1. The interconnection from the central office exchange to the trunk line connected to the first digit selector 100 is usually made via repeaters to pass the remaining three digits of the seven digit number on to the paging interface equipment at the rate of ten pulses per second. The fifth digit is then applied to the first digit selector 100 (FIG. 2). In the embodiment shown and described herein, the fifth digit will be described as being either 0, 1, 2 or 3. All digits dialed into the system for the fifth digit between the numbers 4 and 9 will trigger a recording device for indicating that the dialer has dialed a wrong number. It is to be understood, however, that the circuitry described herein may be easily converted to a circuit for handling a plurality of numbers for the fifth digit other than the numbers 0, 1, 2 and 3. After the fifth digit has been dialed, the sixth digit and the seventh digit are directed through the first digit selector and transferred to the two digit selector 200 (FIGS. 3 and 3A). The sixth and seventh digits may be any number between 0 and 9. A tone corresponding to the number of the digit is generated by tone generator 300. Likewise, a second tone corresponding to the number of the seventh digit is generated by tone generator 300 and is passed through the two digit selector 200 to the selector finder 500 (FIG. 5) which when the transmitter is available for voice transmission opens the incoming trunk lines of the first digit selector 100 through terminal 600 to transmitter 700. In the event that a remote radio receiver is inoperative, a new receiver having a different sixth and seventh digit address, may be substituted for the inoperative receiver with the address of the inoperative receiver being assigned to the new receiver. As will be described later in this specification, a dial-a-spare panel 400 (FIG. 4) is provided whereby the new receiver may be reached by dialing the address of the inoperative receiver. The address of the new receiver as well as the address of the old receiver are inserted into panel 400 thereby allowing the dialer to reach the new receiver by dialing the address of the inoperative receiver.

Operation of FIG. 2

FIG. 2 is an electrical schematic diagram of the first digit selector 100. The first digit selector has eight relays 101, 110, 120, 130, 140, 150, 160 and 170 and an electrically operated stepping switch 180. It should be noted at the outset that many relays of this apparatus have a pair of control coils each when energized moving the contacts to the activated position. That is, one control coil will move the contacts to the same position as the other control coil. The incoming trunk lines 102 and 103 are connected respectively to the normally closed set in contacts 133 and 134 of relay 130. Incoming trunk line 102 is referred to in the industry as the "tip" line whereas line 103 is referred to as the "ring" line. When the fifth digit is applied across lines 102 and 103, the pulsed signal is applied through the normally closed set in contacts 133 and 134 to the two control coils in relay 101. Relay 101 is a fast-acting relay and as a result opens and closes its contacts 104 in accordance with the incoming fifth digit pulse signal. One side of the control coil of relay 110 is connected to a negative source of electrical energy whereas the other side of the control coil is connected to the normally opened contact of relay 101. The center contact of relay 101 is connected to ground potential. Thus, as the normally opened contact of relay 101 closes, the control coil of relay 110 is connected to ground potential thereby activating the contacts of relay 110. Relay 110 is a slow-release relay so as pulses are received by the single control coil of relay 110, the contacts will hold during the dial pulse. Thus, the normally opened contacts 111 and the normally opened set in contacts 112 of relay 110 will be closed at all times during the receipt of the fifth digit. Thus, the ground potential connected to the center contact of contacts 112 will be routed through the normally closed contacts 182 of stepping switch 180 to one of the control coils of relay 120. The opposite side of the control coil of relay 120 connected to contacts 182 is connected to a negative source of electrical energy. As a result, one of the control coils of relay 120 is energized thereby closing normally open contacts 121 and opening normally closed contacts 122. One contact of contacts 121 is connected to the normally open contacts 111 of relay 110 whereas the other contact of contacts 121 is connected to a second control coil of relay 120 which is connected at its opposite side to the control coil of stepping switch 180. In one embodiment, the control coil of relay 120 connected to contacts 182 was a 500 ohm coil whereas the second control coil of relay 120 was a 5 ohm coil. Since contacts 121 are closed during the entire dialing of the fifth digit, and since contacts 111 are also closed during the dialing of the fifth digit, the pulse signal generated by the closing and opening of contacts 104 is applied through contacts 111 and 121 to the control coil of stepping switch 180. One side of the control coil of stepping switch 180 is connected to a negative source of electrical energy whereas the other side of the control coil of stepping switch 180 is connected through contacts 121 and 111 to the ground potential connected to contacts 104. Thus, as the pulsed fifth digit is applied to relay 101, the stepping switch 180 will correspondingly step through the appropriate number of positions. For example, if the fifth digit is the number 3, contacts 104 will open and close three separate times thereby connecting and disconnecting ground potential through contacts 111 and 121 to the control coil of stepping switch 180 three separate times. As a result, the six decks 184 through 189 of stepping switch 180 will move three times to the third position. Contacts 181, 182 and 183 will move from the normal position wherever the stepping switch is off of the home position. Thus, the normally closed contacts 182 will open during the dialing of the fifth digit thereby disconnecting the ground potential to the 500 ohm coil of relay 120. Contacts 121 being connected to the second control coil of relay 120 hold relay 120 in the activated position during the dialing of the fifth digit. Relay 120 releases after the last pulse of the fifth digit is received.

In the embodiment described herein, it is assumed that the fifth digit may be either numbers 1, 2, 3 or 0. Thus, whenever numbers 4 through 9 are dialed into the system as the fifth digit, an intercept circuit is activated thereby triggering a recorded signal indicating a wrong number has been dialed. Relay 160 (FIG. 2) has a control coil one side of which is connected to a negative source of electrical energy whereas the other side of the control is connected through the normally closed contacts 122 of relay 120 to the rotor of deck 189 of stepping switch 180. The contacts corresponding to numbers 4 through 9 on the nonmovable portion of deck 189 are connected together to ground potential. When the rotor of deck 189 steps to the position corresponding to the numbers 4 through 9, ground potential is thereby connected through closed contacts 122 to the coil or relay 160 thereby closing contacts 161 through 163 of relay 160. Terminals 164 and 165 are connected through the closed contacts 161 and 162 to wires 168 and 169 which are in turn connected to contacts 134 and 133 to the incoming trunk lines 102 and 103. A recorder (not shown) is connected to the terminals 164 and 165 and provides a signal indicating that a nonworking number has been dialed. This signal is applied through terminals 164 and 165 as described to the incoming trunk lines 102 and 103. Terminals 166 and 167 are connected to a recorder control across contacts 163. As a result, the recorder may be controlled whenever contacts 163 are closed.

Assuming that a working number has been dialed for the fifth digit; that is, the numbers 0, 1, 2 or 3, then one of two situations will exist. The first situation is where the succeeding two digit selector 200 (FIG. 3) is busy whereas the other situation is where the two digit selector is not busy. Referring now to FIG. 3, the two digit selector has a relay 210 with contacts 212 one of which is connected to ground potential. Whenever the two digit selector is busy, relay 210 will be activated thereby connecting the ground potential through contacts 212 out through lead 214 which is connected to deck 185 (FIG. 2) of the first digit selector. There is a separate two digit selector connected to each one of the contacts of deck 185 corresponding to the work numbers of the fifth digit. That is, if the system is operable with a fifth digit of a number only of 1, 2, 3 or 0, then a two digit selector would be connected to contact one of deck 185 whereas another two digit selector would be connected to contact 2 of deck 185. Likewise, two additional two digit selectors would be connected to contacts 3 and 0 of deck 185. Contacts 1, 2, 3 and 0 of deck 185 are connected respectively to contacts 1, 2, 3 and 0 of deck 187. Thus, whenever the two digit selector is busy a ground potential is applied through deck 185 to deck 188 which has its rotor connected through normally closed contacts 141 and 123 to one side of the control coil for relay 150. The opposite side of the control coil of relay 150 is connected to a negative source of electrical energy thereby providing for the activation of relay 150 whenever the two digit selector is busy. Normally open contacts 154 and 155 will thereby close. A busy tone generator is connected across terminals 151 and 152 and will therefore apply a busy signal through contacts 154 and 155 to wires 168 and 169 and incoming trunk lines 102 and 103. A busy tone generator control is connected to lead 153 which is connected to ground potential through contacts 156. Whenever relay 150 is operated, the relay will lock in the activated state through its closed contacts 157. Relay 150 also applies ground potential through normally open contacts 158 and contacts 132, deck 184 and contacts 183 and 181 to return the stepping switch 180 to the home position or to its normal state.

Whenever the two digit selector is not busy, relay 110 (FIG. 2) will not be energized thereby providing a connection of a negative source of electrical energy through contacts 212 (FIG. 3) and through lead 214 to deck 185 of stepping switch 180 (FIG. 2). This negative source of electrical energy will therefore be routed through the rotor of deck 185 and through the normally closed contacts 124 as soon as the fifth digit has been dialed and relay 120 has been unactivated. The source of electrical energy connected through contacts 124 will then be routed through diode 135 to a control coil of relay 130 having its opposite side connected through diode 136 which in turn is connected to diode 135. Diodes 135 and 136 are arranged to allow current flow from diode 135 through the coil of relay 130 and then through diode 136. Relay 130 is thereby activated closing the normally opened set of contacts 131. To prevent relay 130 from deactivating when the first digit selector seizes the second digit selector, contacts 131 are connected to the second control coil of relay 130. As previously mentioned, when the second digit selector is seized, relay 210 (FIG. 3) will close thereby routing ground potential through lead 214 to deck 185. The ground potential will therefore be connected through diode 135 (FIG. 2) to contacts 131 to the second control coil of relay 130. The opposite side of the second control coil of relay 130 is connected to a negative source of electrical energy. Therefore, contacts 131 will hold relay 130 in the activated position after the first digit selector seizes the two digit selector. Simultaneously, with the closing of contacts 131, relay 140 will be activated thereby opening contacts 141 and thereby preventing the connection of ground potential through contacts 123 to the busy signal relay 150. The normally opened set of contacts 133 and 134 of relay 130 will close as soon as relay 130 is activated thereby connecting incoming trunk lines 102 and 103 directly to the rotors of deck 186 and 187. With the activation of relay 130, the normal closed set of contacts 134 and 133 will be opened thereby deactivating relay 101 providing for the eventual deactivation of relay 110. The operation of the first digit selector is therefore complete with a path being provided from the incoming trunk lines 102 and 103 directly through the circuit to decks 186 and 187 which are connected to the two digit selectors. The same two digit selector connected to lead 1 of deck 185 is connected to leads 1 of decks 186 and 187. Likewise, the same two digit selector connected to lead 2 of deck 185 is connected to leads 2 of decks 186 and 187 and the same applies to the other two digit selectors.

Operation of FIGS. 3 and 3A

Figure 8:
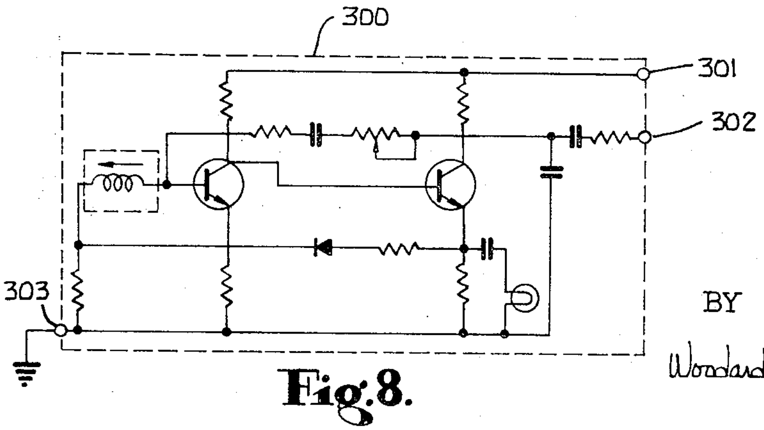
FIG. 8 is a schematic diagram of one type of tone generator adaptable for use with the present invention.

After the first digit selector has received the fifth digit and a path has been cleared to the two digit selector for the sixth and seventh digits, the sixth digit is dialed. The sixth digit appearing across incoming trunk lines 102 and 103 (FIG. 2) is routed through decks 186 and 187 which in turn are connected to leads 215 and 216 of the two digit selector. In the embodiment shown in FIG. 2, a total number of four two digit selectors would be required, each one respectively being connected to a lead off of decks 185, 186 and 187. For example, if the fifth digit was a number 2 then the sixth digit would be routed through the two digit selector connected to the number 2 fixed contacts of decks 186 and 187. The sixth digit then crosses the closed set in contacts 271 and 272 (FIG. 3) thereby energizing the double control coil relay 201. The normally opened set in contacts 202 then close applying ground potential to the control coil of relay 210 which closes the normally opened set in contacts 211, 212 and 213. Ground potential is thereby connected through the normally opened set in contacts 213 to the closed contacts 282 thereby energizing one of the control coils of relay 220 which energizes closing the normally opened set in contacts 221 which routes ground potential from closed contacts 211 and 202 to the second control coil of relay 220 thereby holding relay 220 in the activated position. Relay 201 is a fast-acting relay and therefore closes and opens its contacts in accordance with the sixth digit pulses received. Relay 210 is a slow-release relay in that it remains closed at all times during the dialing of the sixth digit. The sixth digit may be any number from 0 to 9. Relay 220 likewise remains closed during the pulsing of the sixth digit. Thus, as the pulsed sixth digit is received by the relay coil of relay 201, the ground potential will be connected and disconnected through the normally closed set in contacts 202 through closed contacts 211 and 221, through the control coil of relay 220 to the control coil of stepping switch 280. Thus, as pulsed sixth digit is received, stepping switch 280 will step to the appropriate position. That is, if the sixth digit is the number 8 then stepping switch 280 will step to the eighth position. Relay 220 is held in the energized position through contacts 282 of switch 280. Contacts of deck 283 are connected together through contacts 281 to control coil of stepping switch 280. The 10 fixed contacts of deck 284 are each connected through tone cable 214 to 10 separate tone generators each of which generates a different tone. A typical tone generator is shown in FIG. 8 with the tone generator also being shown and disclosed in FIG. 3 of U.S. Pat. No. 3,510,864 which is hereby expressly incorporated by reference. Lead 301 of said tone generator (FIG. 8) is connected to a source of electrical energy whereas lead 303 is connected to ground potential. Lead 302 is connected to one of the fixed contacts of deck 284 (FIG. 3). Thus, as stepping switch 280 steps to the appropriate position, the tone generator connected to the contact aligned with the rotor of 284 will apply a tone through the contact and rotor and out the terminal 403 to the dial-a-spare panel 400 shown in FIG. 4. The tone corresponding to the sixth digit will be received by lead 403 (FIG. 4) and routed through a series of closed contacts and out of the dial-a-spare panel through lead 405 which in turn is connected to lead 405 of the two digit selector. The tone corresponding to the sixth digit continuing through lead 405 of the two digit selector is applied to normally opened contacts 242 (FIG. 3A) of relay 240. FIGS. 3 and 3A show the complete two digit selector and have been separated because of size limitation. The alphabetical leads of FIG. 3 are joined to the respective alphabetical leads of FIG. 3A.

The seventh digit is then dialed and received across the incoming lines 215 and 216 (FIG. 3) across the normally closed set in contacts 271 and 272 thereby pulsing relay 201 in accordance with the pulses of the seventh digit. Relay 210 then is activated and holds in the activated position during the dialing of the seventh digit. Ground potential is therefore connected and disconnected to the normally opened set in contacts 202 through the closed contacts 211 and 221 to the normally opened contacts 231 of relay 230. Relay 220 is unenergized since contacts 282 are open after the sixth digit is selected. Simultaneously, the normally opened set of contacts 213 are closed by relay 210 thereby applying ground potential through the closed contacts 291 (FIG. 3A) of the second stepping switch 290 to one of the control coils of relay 230. As a result, relay 230 is thereby activated and the pulsing ground potential applied to contacts 231 is applied through the second coil of relay 230 directly to the control coil of the second stepping switch 290. The ground potential applied to the first control coil of relay 230 by contacts 291 is sufficient to hold relay 230 in during the pulsing of the second digit. The 10 fixed contacts of the second deck 293 of the stepping switch 290 are each connected to a separate tone generator as shown in FIG. 8. Each of the tone generators connected to the 10 separate contacts of deck 293 generate a separate tone so as to apply a distinct tone to the rotor of deck 293 depending upon which fixed contact the rotor stops. Of course, the rotor of deck 293 is directed to the fixed contact corresponding to the number of the seventh digit. The tone is thereby applied through the rotor of deck 293 and out of the two digit selector via lead 404 to lead 404 of the dial-a-spare panel 400 shown in FIG. 4. The tone then is routed through a series of closed contacts and out of the dial-a-spare panel via lead 406 to lead 406 of the two digit selector which is connected to the normally open set in contacts 243 of relay 240. Thus, the A tone will be present on contacts 242 whereas the B tone will be present on contacts 243.

Figure 4:
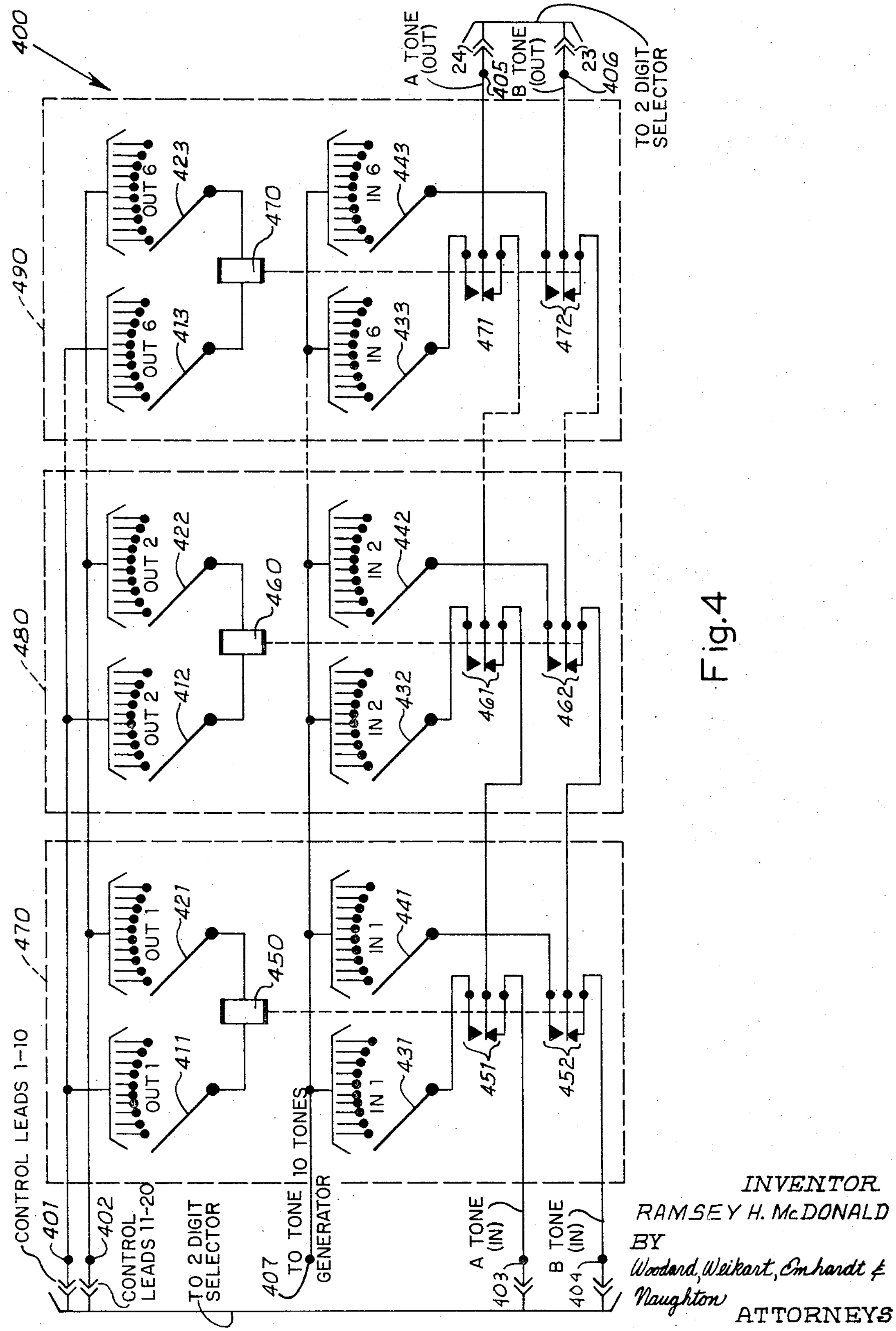
FIG. 4 is a schematic diagram of the dial-a-spare panel.

Operation of FIG. 4

As previously mentioned, the dial-a-spare panel 400 is provided so as to allow use of a new remote paging receiver which may be activated by dialing the sixth and seventh digits previously assigned to the receiver which is replaced. The dial-a-spare panel has a plurality of individual switch assemblies 470, 480, 490, etc. each of which has four separate rotary switches. For example, assembly 470 has four switches 411, 421, 431 and 441. The sixth and seventh digits assigned to the replaced receiver are dialed into respectively switches 411 and 421 whereas the sixth and seventh digits assigned to the new substitute receiver was dialed into respectively switches 431 and 441. Ten leads are secured to the 10 fixed contacts of deck 287 of stepping switch 280. These 10 leads are routed through cable 401 which is connected to cable 401 of the dial-a-spare panel. As a result, as the sixth digit is received, the rotor of deck five connects ground potential through cable 401 to the fixed contacts of switch 411. The 10 fixed contacts of switch 421 are connected to cable 402 which in turn is connected to cable 402 of the two digit selector which is connected to the 10 fixed contacts of deck 296. The rotor of deck 296 is connected to a negative source of electrical energy thereby connecting the electrical energy through cable 402 whenever the seventh digit is received by the second stepping switch. As a result, a ground potential and a negative source of electrical energy is placed across the relay 450. Activation of relay 450 results in the closing of the normally opened set in contacts 451 and 452. Ten tone generators are connected through a 10 wire cable 407 to cable 407 of the dial-a-spare panel. Cable 407 is connected to the fixed contacts of rotary switches 431 and 441. Thus, whenever the sixth and seventh digits assigned to the replaced receiver are inserted into the system, the new sixth and seventh digit signals assigned to the substitute receiver will be provided by the dial-a-spare panel. The tones are applied out through leads 405 and 406 eventually being routed to contacts 242 and 243 of relay 240 (FIG. 3A). Switch assemblies 480 and 490 operate identically to assembly 470 having replaced sixth and seventh digit switches 412, 413 and 422, 423 and substitute sixth and seventh digit switches 432, 433 and 442, 443 operable to switch relays 460, 470 and close contacts 461, 462 and 471, 472. Assembly 470 is used to assign a new address to one receiver whereas assemblies 480 and 490 are used to assign new addresses to other receivers. The assemblies may be connected in series since only one incoming sixth and seventh digit call is allowed by the two digit selector.

Figure 5:
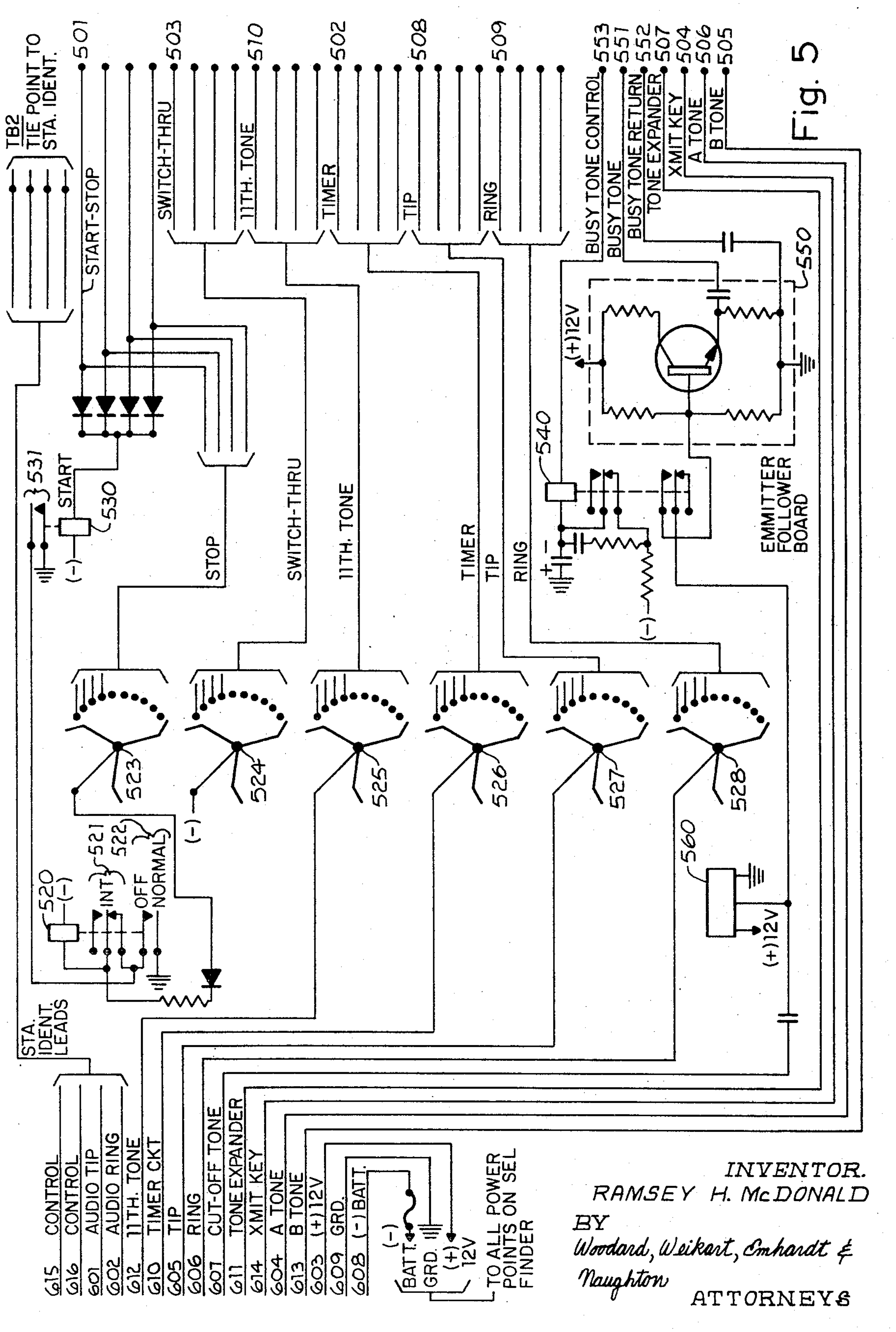
FIG. 5 is a schematic diagram of the selector finder.

Operation of FIG. 5

The tones present on leads 505 and 506 of the two digit selector are routed through leads 505 and 506 of the selector finder (FIG. 5) whenever the selector finder is not busy. Contacts 242 and 243 are closed by relay 240 thereby allowing the tones to pass through leads 505 and 506 into the selector finder. Relay 240 is energized by having its control coil connected to a source of electrical energy present on lead 503 and to a ground potential present on lead 501. Lead 503 of the two digit selector is connected to lead 503 of the selector finder. A stepping switch 520 has a second deck 524 with a rotor connected to a source of electrical energy. As a result, the electrical energy will be connected through the rotor of deck 524 to lead 503 whenever the rotor is positioned on the fixed contact connected to lead 503. This source of electrical energy is used to operate relay 240. The ground potential present on lead 501 is provided through normally closed contacts 264 and 232 from the normally opened contacts 298. Whenever stepping switch 290 is positioned away from its home position, contacts 298 are closed thereby connecting the ground potential thereof to contacts 232 which close after the seventh digit has been dialed. Relay 230 deactivates upon completion of the dialing of the seventh digit thereby allowing contacts 232 to close and routing the ground potential lead 501. The ground potential on lead 501 of the two digit selector (FIG. 3) is connected to lead 501 of the selector finder (FIG. 5) thereby connecting the ground potential to relay 530 which closes the normally opened contacts 531 allowing ground potential to pass through the normally closed set of contacts 521 to the control coil of stepping switch 520. The rotor of deck 523 of stepping switch 520 is connected to the control coil of stepping switch 520. The opposite side of the control coil of stepping switch 520 is connected to a negative source of electrical energy. The two digit selector calls the selector finder by placing a ground on wire 501. Thus, once stepping switch 520 has been activated by starting relay 530 the contacts 531 of the relay 530 operate stepping switch 520 until the normally closed set of contacts 521 are opened by stepping switch 520. Stepping switch 520 will rotate the rotor on deck 523 self-interrupting the control coil on the stepping switch until a ground is encountered on the fixed contact of deck 523 connected to the ground potential on lead 501. Simultaneously, the rotor of deck 524 will connect the source of electrical energy connected to the rotor to lead 503 thereby energizing relays 240 and 270 providing a path for the tone present on leads 505 and 506 through the selector finder exiting the selector finder on leads 604 and 613 connected to the same identified leads of the tone and voice terminal 601 shown in FIG. 6.

Figure 7:
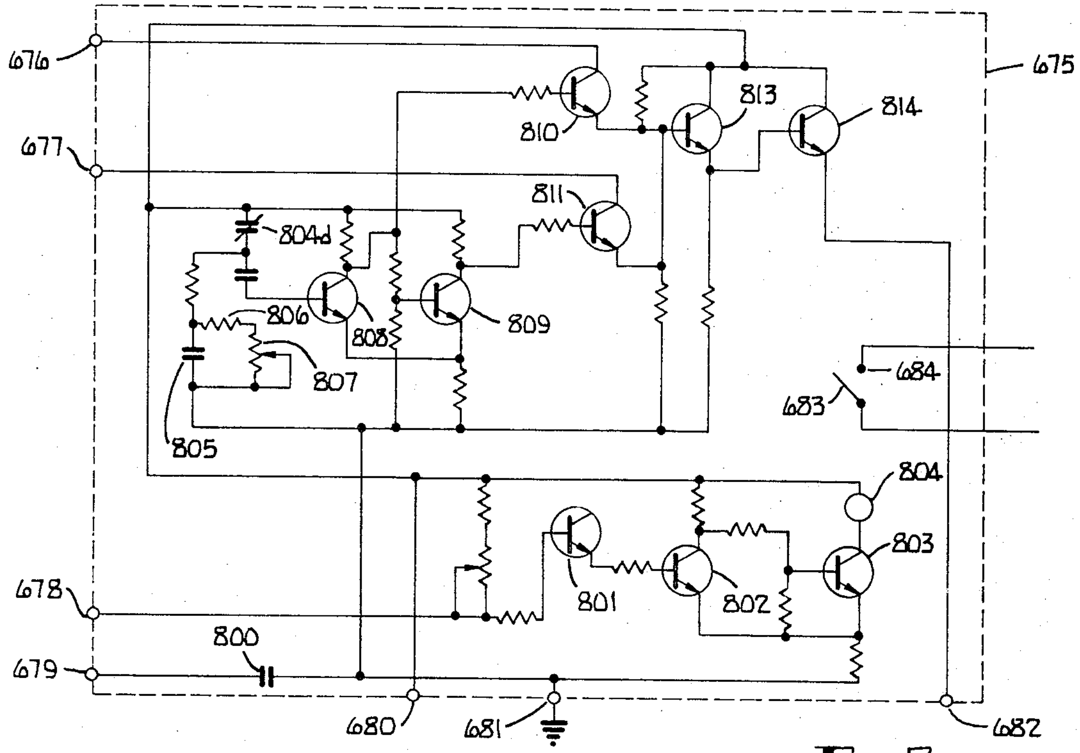
FIG. 7 is a schematic diagram of the timing and tone gating circuit of terminal 600.

Terminal 600 (FIG. 1) is composed of the tone and voice terminal 601 (FIG. 6) and the tone and timer board 675 (FIG. 7). The tone and timer board 675 has been previously described and disclosed in FIG. 2 by U.S. Pat. No. 3,510,864 and the description therein pertaining to the tone and timer board is expressly incorporated by reference herein. As a result of activation of relay 240, the normally opened set in contacts 244 are closed thereby connecting a source of electrical energy to lead 504 of the two digit selector which is connected to lead 504 of the selector finder exiting the selector finder on lead 614 which is connected to the same identified lead of the tone and voice terminal thereby activating relay 630 (FIG. 6) thereby closing the normally opened set in contact 631 so as to key transmitter 700. In addition, activation of relay 630 closes the normally opened set in contacts 634 operating the tone and timer board start connection. Leads 676 through 680 and leads 682 through 684 are connected to the leads of like number of the tone and timer board shown in FIG. 7. When the normally opened set in contacts 634 close, leads 678 and 679 of the tone and voice terminal 601 are connected together and capacitor 800 (FIG. 7) starts to charge. During the charging of capacitor 800, transistors 801 and 802 are switched off and transistor 803 is switched on. During conduction of transistor 803, relay 804 is energized performing the following functions: (1) starts secondary timer capacitor 805, resistor 806 and resistor 807 which controls the length of the first tone corresponding to the sixth digit; (2) operation of contacts 804d allows transistor 808 to conduct from positive charge of capacitor 805. The collector voltage of transistor 808 drops to approximately 1½ volts switching off transistor 809 and 810. Transistor 810 cuts off the second tone corresponding to the seventh digit to transmitter 700. The collector voltage on transistor 809 raises to approximately 12 volts turning on transistor 811. When transistor 811 is on, a first tone corresponding to the sixth digit is allowed to pass from the tone generator to the transmitter via Altec compression amplifier 701. Amplifier 701 is commercially available from the Altec Co., Anaheim, Calif. under Model No. 460A. When capacitor 805 discharges sufficiently transistor 808 turns off. The collector voltage of transistor 808 raises to about 12 volts. When transistor 809 turns on, transistor 811 turns off and the first tone corresponding to the sixth digit is not allowed to be transmitted. Transistor 810 turns on allowing the second tone corresponding to the seventh digit to be transmitted. The tones supplied from either transistor 811 or 810 whichever is turned on gates the emitter follower 813 which drives transistor 814. The arrangement of emitter followers 813 and 814 provide matching to the impedance output circuit to the Altec amplifier. (3) When capacitor 800 is charged, transistors 801 and 802 are again turned on, transistor 803 is switched off and relay 804 releases.

As will be seen from FIG. 5, the selector finder has a plurality of leads connected to each deck of stepping switch 520. This is because a plurality of two digit selectors are connected to a single selector finder. One selector is connected to leads 501, 503, 510, 502, 508 and 509 of the stepping switch 523. Likewise, a second selector finder is connected to one lead of each deck. Additional two digit selectors are connected to the selector finder until all of the contacts on the stepping switch deck are connected. As a result, the selector finder may be busy handling a call from one two digit selector when another two digit selector is requesting time on the transmitter. Relay 250 (FIG. 3) operates whenever the control coil thereof is connected to ground potential via contacts 264, 232 and 298 with the opposite side so the control coil of relay 250 being connected to a source of electrical energy via the normally closed set in contacts 244. Activation of relay 250 results in the closing of contacts 251, 252 and 253 thereby connecting a recorder having a recorded message such as "One moment please" through contacts 251 and 252 to the incoming trunk lines of the two digit selector 215 and 216. When the selector finder is not busy, the rotor on deck 524 will connect a source of electrical energy through lead 503 thereby activating relay 240 and disconnecting the source of electrical energy via contacts 244 to relay 250. Relay 250 will then deactivate opening contacts 251 through 253 and allowing the two digit selector to be connected to the selector finder.

It should be noted that leads 501 through 510 (FIG. 5) of the two digit selector are connected respectively to leads 501 through 510 of the selector finder. Likewise, leads 551, 552 and 553 are connected respectively to leads 151, 152 and 153 of the one digit selector whereas leads 601 through 616 of the selector finder are connected respectively to leads 601 through 616 of tone and voice terminal 601.

Figure 6:
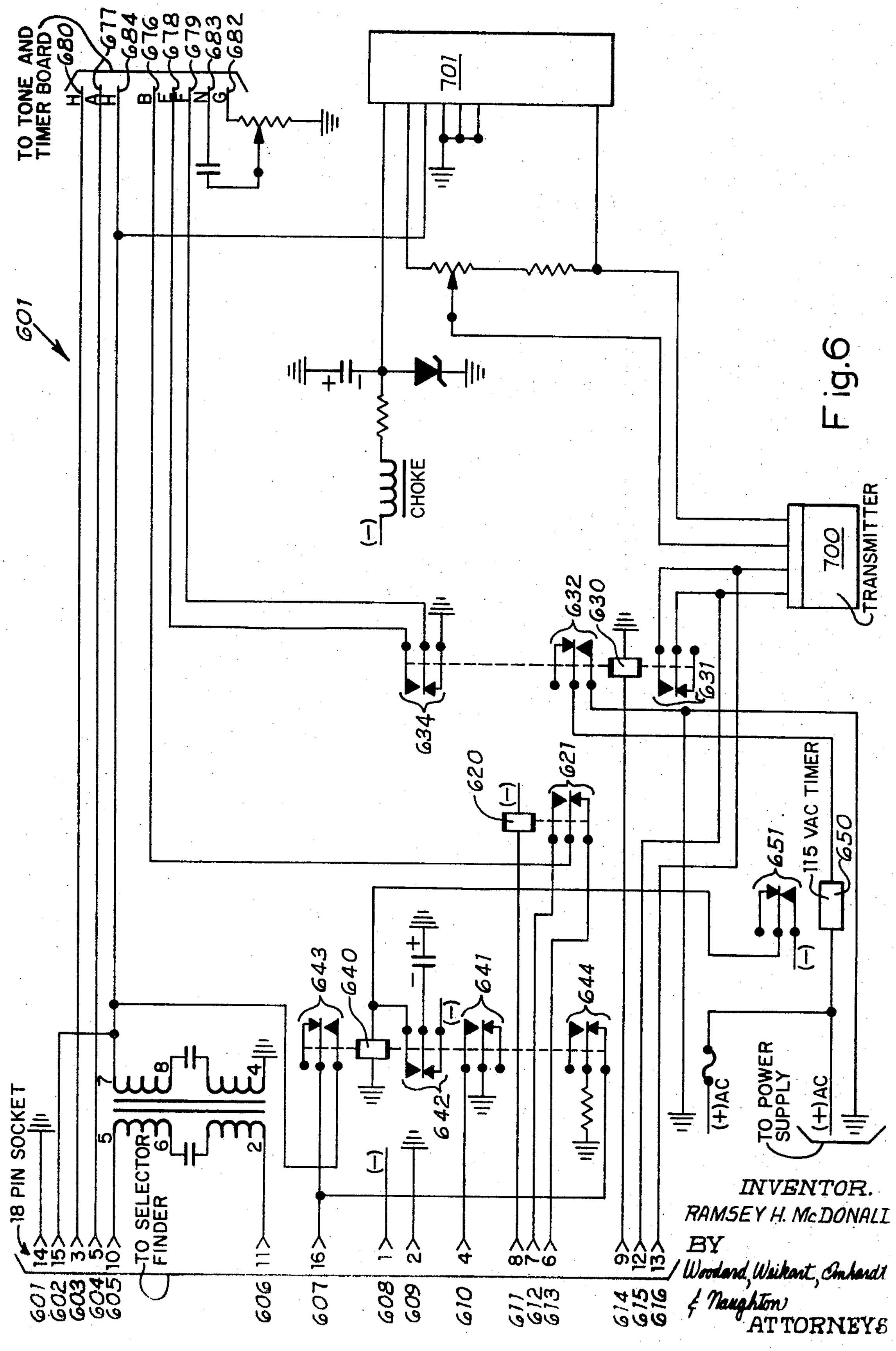
FIG. 6 is a schematic diagram of the tone and voice terminal of terminal 600 shown in FIG. 1.

The length of an air time is controlled by the settings selected on the 115 volt AC timer 650 (FIG. 6). Release of the relay 630 is made either by the calling party hanging up before the timer cut off is operated or if the trunk line is held open too long the timer will operate relay 640 routing ground potential through contacts 541, lead 610, lead 502 and deactivating relay 210. Operation of relay 640 will connect the cut off tone via lead 607 from the tone generator 560 to the repeat coil connected to leads 605 and 606 of the tone and voice terminal and the cut off tone will be heard by the party calling and also the pager called. Leads 605 and 606 are connected through leads 508 and 509 to lines 215 and 216. The normally opened set in contacts 643 will close. Release of relay 201 will return all of the stepping switches to home position so that the system cannot be tied up on the air. Relay 201 will release either from opening of the loop on the trunk line or from the ground potential applied through lead 610 and 502.

If the sixth and seventh digits are the same identical number, then generation of two tones of the same frequency will result in an improper response by the remote paging receiver. Thus, an eleventh tone is generated to replace the tone assigned to the number of the seventh digit. The 10 fixed contacts on deck 285 (FIG. 3) are connected respectively to the 10 fixed contacts on lead 294. Thus, if the sixth digit is the same as the seventh digit then stepping switch 280 and 290 will position the rotor on decks 285 and 294 on the fixed contacts connected together thereby applying a ground through decks 285 and 294 to the closed contacts 241 of relay 240 which has been energized as a result of the selector finder not being busy. The ground potential is then routed out through lead 507 of the two digit selector and through the selector finder exiting the selector finder on lead 611 thereby activating relay 620 (FIG. 6) of the tone and voice terminal. The normally opened set in contacts 621 will thereby close connecting lead 612 to the tone and mixer board 675. Lead 612 is connected to deck 525 (FIG. 5) of stepping switch 520. The fixed contact of deck 525 touching the rotor of deck 525 is connected through lead 510 of the two digit selector which is eventually connected to the eleventh tone generator. Thus, an 11th tone will be substituted for the tone associated with the seventh digit and the remote pager will be activated.

By connecting decks 286 and 295 (FIG. 3) together, it is possible to provide a busy signal for a non-working number. For example, assuming that the number 6 was a non-working number then the sixth contacts of decks 286 and 295 would be interconnected. The rotor of deck 295 is connected through the normally closed contacts 233 to relay 260 having the opposite side of the control coil of relay 260 connected to a negative source of electrical energy. The rotor of deck 286 on the other hand is connected through normally opened contacts 288 to the normally opened contacts 213 of relay 210. Thus, as the number is being dialed, relay 210 will be activated thereby applying ground potential through the contacts 213. Simultaneously, stepping switch 280 will be activated thereby closing contacts 288 and routing the ground potential through deck 286. The rotor of deck 286 will be positioned at the contact associated with the non-working number as will the rotor associated with deck 295 thereby applying ground potential through contacts 233 to relay 260 which closes its normally opened contacts 261 through 263. A recorder having its control connected to contacts 263 will thereby be activated providing a recorded message for intercept service for the number out of service through contacts 261 and 262 to the incoming trunk lines 215 and 216.

Another feature of the present invention is that the caller will hear the pair of tones associated with the sixth and seventh digits and therefore the caller knows to start talking after the tones have stopped. The tones from line 684 is fed to the Altec amplifier and to the repeat coil 900 which is connected to the tip and ring leads 605 and 606.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A paging system adapted to be connected to a radio base station transmitter which allows incoming calls from a dial telephone to be directed to a new receiver substituted for an inoperative receiver when the dialed digit address of said inoperaive receiver has been inserted into said system via said telephone, said inoperative receiver being activated when operative by a given pair of tones whereas said new receiver being activated by a substitute pair of tones, comprising:

tone generators being arranged to generate tones which include said given pair of tones and said substitute pair of tones;

digit selectors connected to said tone generators and being operable to distinguish said dialed digit address and to then select said given pair of tones from said tone generators;

first means connected to said digit selectors and said tone generators operable to select said substitute pair of tones from said tone generators and replace said given pair of tones with said substitute pair of tones assigned to said new receiver; and, selecting means connected to said digit selectors, said first means and said transmitter and operable to direct only said substitute pair of tones to said radio base transmitter.

2. The system of claim 1 wherein:

said first means has a switch assembly with a pair of first switches, a pair of second switches and a relay with control means, normally opened contacts and normally closed contacts, said normally opened contacts are connected between said second switches and said digit selectors and said normally closed contacts are connected between said tone generators and said digit selectors, said first switches operably connect said control means to a source of electrical energy when said given pair of tones are received by said first means including said normally closed contacts, said second switches are connected to said tone generators receiving said substitute pair of tones and are connected to said normally opened contacts.

3. The system of claim 2 wherein:

said digit selectors are a first digit selector and a plurality of two digit selectors connected thereto, said first digit selector has a pair of incoming trunk lines and a stepping switch operable in response to a first pulsed signal of said dialed digit address on said lines to connect said lines to a vacant one of said two digit selectors.

4. The system of claim 3 wherein:

said vacant digit selector has a pair of stepping switches operable in response to a second and third pulsed signal of said dialed digit address on said lines to direct said given pair of tones to said first means.

5. The system of claim 4 wherein:

said vacant two digit selector has a switching relay operably connected to said selecting means, said switching relay directs said substitute pair of tones to said selecting means.

6. The system of claim 5 wherein:

said selecting means has a selecting stepping switch operable to connect said lines to said transmitter when said substitute pair of tones are received by said selecting means.

7. The system of claim 6 wherein:

said first means has a plurality of said switch assemblies connected together in series.

* * * * *